Feb. 25, 1969     E. E. GRASSEL ET AL     3,429,335
FLUID FLOW CONTROL APPARATUS
Filed Dec. 15, 1965
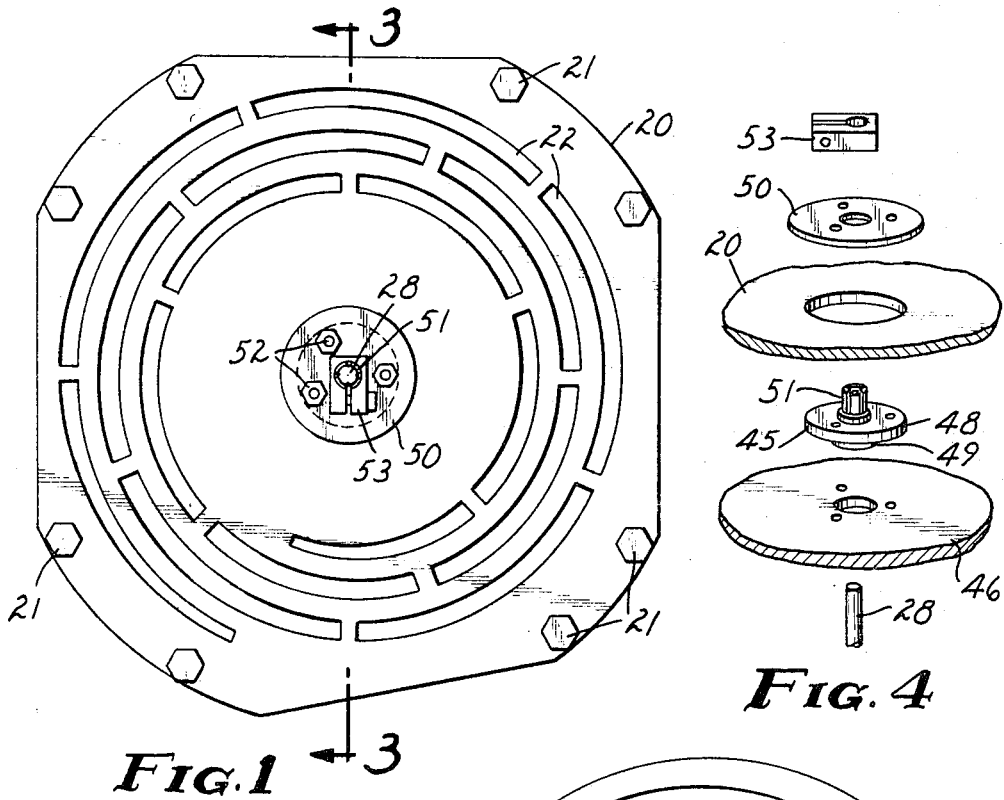
FIG. 1
FIG. 4
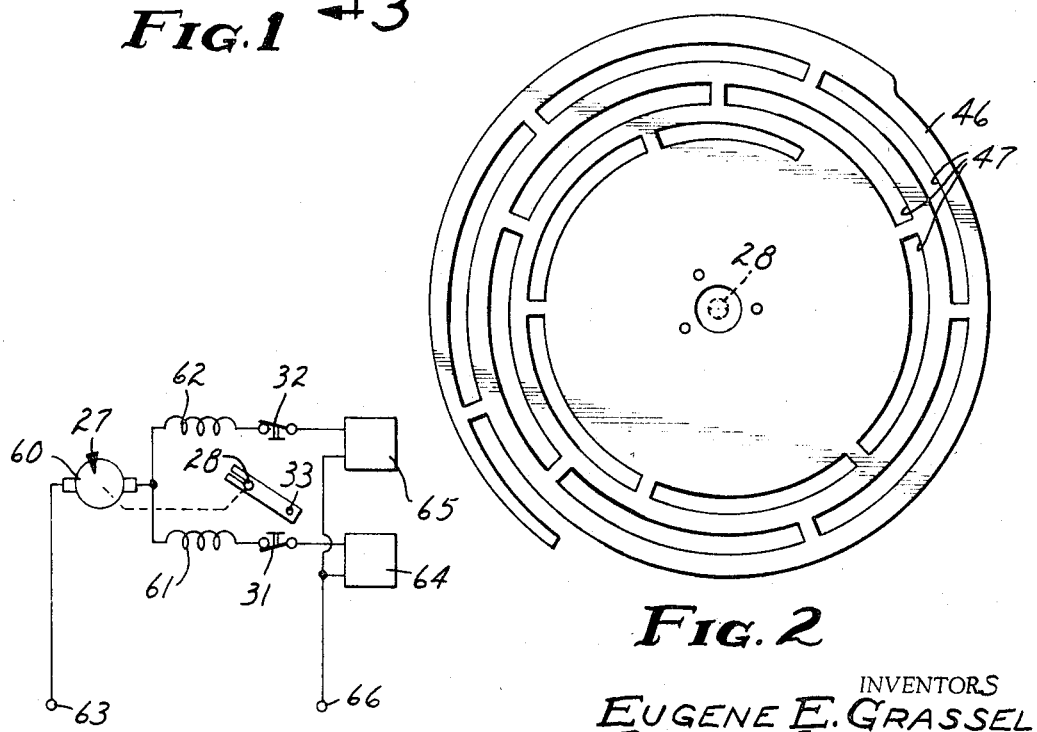
FIG. 2
FIG. 6
INVENTORS
EUGENE E. GRASSEL
DONALD W. SCHOEN
BY Merchant + Gould
ATTORNEYS INVENTORS
EUGENE E. GRASSEL
DONALD W. SCHOEN
BY Merchant & Gould
ATTORNEYS

United States Patent Office 3,429,335
Patented Feb. 25, 1969

3,429,335
FLUID FLOW CONTROL APPARATUS
Eugene E. Grassel, Minneapolis, and Donald W. Schoen, St. Paul, Minn., assignors to Donaldson Company, Inc., Minneapolis, Minn., a corporation of Delaware
Filed Dec. 15, 1965, Ser. No. 513,959
U.S. Cl. 137—487.5    2 Claims
Int. Cl. G05d 7/06; F16k 3/08, 31/04

ABSTRACT OF THE DISCLOSURE

A motor operated valve operable to control the flow of fluid through a passageway by means of a pair of plates mounted parallel and in juxtaposition with each plate having a single start, double pitch spiral slot means therethrough beginning adjacent the outer edge of said plate and spiralling inwardly about the axis thereof so as to provide a maximum flow in the overlying position and substantially no flow in a rotated or unmatched position, said motor being controllable between the open and closed positions by pressure responsive means connected to maintain the pressure in the passageway between predetermined levels.

---

This invention pertains to fluid flow control apparatus and more specifically to apparatus for controlling the flow or controlling the flow to maintain a pressure of a fluid through a pasageway or into a chamber between predetermined amounts.

It is an object of the present invention to provide a new and improved fluid flow control apparatus.

It is a further object of the present invention to provide fluid flow control apparatus which maintains the pressure of a fluid in a chamber or passageway between predetermined maximum and minimum pressure levels.

It is a further object of the present invention to provide fluid flow control apparatus which is compact and simple to construct with few moving parts.

It is a further object of the present invention to provide fluid flow control apparatus which produces a relatively even flow of fluid across the cross-section of a fluid duct or the like.

It is a further object of the present invention to provide fluid flow control apparatus which is substantially self-cleaning.

These and other objects of this invention will become apparent to those skilled in the art upon consideration of the accompanying specification, claims, and drawings.

Referring to the drawings, wherein like characters indicate like parts throughout the figures:

FIG. 1 is a view in top plan of the present apparatus;

FIG. 2 is a view in top plan of the rotating disk located directly below the stationary disk illustrated in FIG. 1;

FIG. 4 is an exploded view in perspective of the means attaching the rotating disk to the motor shaft;

FIG. 6 is a schematic view of the electrical circuitry utilized in the present apparatus.

Figure 3:
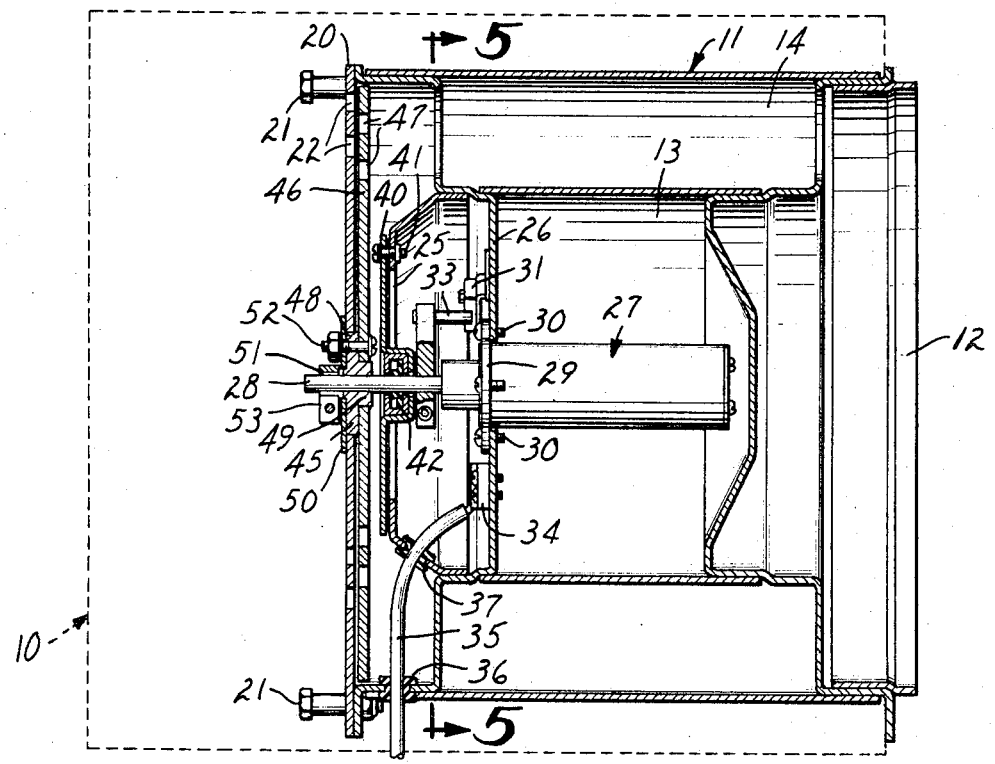
FIG. 3 is a sectional view as seen from the line 3—3 in FIG. 1.
Figure 5:
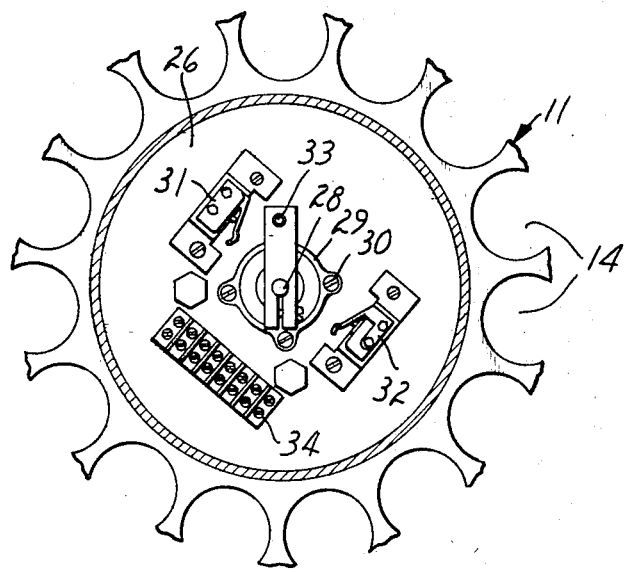
FIG. 5 is a sectional view as seen from the line 5—5 in FIG. 3, parts thereof removed.

In FIG. 3 a dotted line designated 10 represents, although greatly reduced in size, a room, vehicle, or other chamber within which it is desired to maintain the fluid pressure between a maximum and minimum limit. A housing generally designated 11 is mounted within an opening in the walls of the chamber 10 so that an inlet 12 extends out of the chamber 10 while the remainder of the housing 11 is contained within the chamber 10. In this embodiment the housing 11 has a circular shaped cross-section and the inlet 12 is a circular opening at one end thereof. A compartment 13 is located substantially concentrically within the housing 11 and has a plurality of tubular ducts 14 therearound for conducting fluid from the inlet 12 to the other end of the housing 11.

A first plate 20 is fixedly attached by means of bolts 21 to the inner end of the housing 11, which is the left end as seen in FIG. 3. The plate 20 has a single start, double pitch spiral slot means 22 cut therein. The slot means 22 begins adjacent the outer edge of the plate 20 and spirals inwardly in a clockwise direction as viewed in FIG. 1 about the axis of the plate 20. The slot means 22 is not continuous but consists of a plurality of arcuate segments to strengthen the overall assembly. It should be understood that the slot means 22 might be designed in a variety of different ways, but the present embodiment was chosen for illustration because it provides a relatively even flow of fluid across the cross-section of the housing 11.

The compartment 13 has an opening 25 at the left end thereof, as seen in FIG. 3. Portions 26 of the sides of the compartment 13 extend radially inwardly and serve as mounting brackets for an electric motor 27 having a shaft 28. The motor 27 is approximately cylindrical in shape and has a collar 29 extending radially outwardly therefrom which is fixedly attached to the brackets 26 by screws 30. Motor 27 is mounted so that its shaft 28 extends approximately along the longitudinal axis of the housing 11 and through the opening 25 in the compartment 13. In the present embodiment the motor 27 is a series wound split field motor which may be operated on either single phase alternating or direct current. However, it should be understood that any small motor would operate in the present apparatus and the above described motor is utilized for simplicity of explanation.

A pair of limit switches 31 and 32 are fixedly mounted on the front surface of the motor mounting brackets 26 adjacent the shaft 28. The switches 31 and 32 are positioned on either side of the shaft 28 so that an actuating pin 33, which is clamped to the shaft 28 for rotation therewith, has 180° of rotation between the switches 31 and 32. The switches 31 and 32 are of the push button make or break type and have an arm extending outwardly which engages the actuating pin 33 to depress the button and open the switch 31 or 32. A terminal board 34 is also fixedly attached to the motor mounting bracket 26 and is utilized for all electrical connections between the motor 27, the switches 31 and 32 and any external wiring. A two lead wire 35, which passes through a grommet 36 in the outer housing 11 and a grommet 37 in the compartment 13 is connected to the terminal board 34 and brings power to the motor 27.

The opening 25 in the compartment 13 has a cover 40 fixedly attached thereover by screws 41. The cover 40 has a centrally located seal 42 through which the shaft 28 passes. The seal 42 prevents dust and the like from entering the compartment 13, thereby, increasing the life and reliability of the motor 27 and the switches 31 and 32.

The shaft 28 has a hub 45 slideably engaged thereon a portion 48 of which is concentrically fitted within a centrally located hole in the plate 20. A second portion 49 of the hub 45 having a greatly reduced diameter extends outwardly from the rear surface of the plate 20 and through a centrally located hole in a second plate 46. Plate 46 has slot means 47 therein which mate with the slot means 22 in plate 20. When the plate 46 is in a first position relative to the plate 20 the slot means 47 overlie the slot means 22 and provide a maximum opening for the flow of fluid therethrough. When the plate 46 is in a second position with respect to the plate 20, the slot means 47 lie between the slot means 22 and substantially prevent the flow of fluid therethrough. The hub 45 also has an axially extending collar 51, illustrated more clearly in FIG. 4, which projects outwardly from the hub 45 parallel and concentric with shaft 28 and toward the end thereof. A plate 50 having an outer diameter somewhat larger than the opening through the plate 20 is positioned concentrically on the collar 51 so that it is in juxtaposition to the portion 48 of the hub 45. The plate 50, the hub 45 and the plate 46 are fixedly attached together for concentric rotation with the shaft 28 by means of a plurality of bolts 52. The portion 48 of the hub 45 acts as a spacer between the plates 50 and 46 to provide a space for the plate 20 therebetween. The axially extending collar 51 attached to the hub 45 has a plurality of axial cuts therein which allow the compression of the sides of the collar 51 inwardly against the shaft 28 by a clamp 53. Clamp 53 fixedly attaches the collar 51 and the associated hub 45 to the shaft 28 for rotation therewith. Thus, when clamp 53 is tightened, the plate 46 rotates with the shaft 28 while the plate 20 remains stationary.

The motor generally designated 27 and illustrated schematically in FIG. 6 has a wound armature 60 and two field windings 61 and 62. One end of each of the field windings 61 and 62 is electrically connected to one end of the armature winding 60 and the other end of the armature winding 60 is adapted to be attached to a suitable source of power at 63. The free ends of each of the field windings 61 and 62 are attached to immovable contacts of the limit switches 31 and 32 respectively. The limit switches 31 and 32 are of the type which are normally closed and which are momentarily opened when the actuating pin 33 is rotated into engagement therewith by the shaft 28. The movable contacts of the limit switches 31 and 32 are connected to a pair of pressure switches 64 and 65 respectively by the twin lead wire 35. Pressure switch 64 is a low pressure switch which is normally open but closes when the fluid pressure thereon falls below a predetermined value. Pressure switch 65 is a high pressure switch which is normally open but closes when the fluid pressure thereon exceeds a predetermined value. The unconnected sides of both of the switches 64 and 65 are attached to a second line 66 which is adapted to be connected to the other side of the suitable source of power. The pressure switches 64 and 65 are mounted within the chamber 10 so as to sense the fluid pressure therein.

Thus, when the fluid pressure within the chamber 10 falls below a predetermined value the low pressure switch 64 closes and power is applied to the field winding 61 and armature winding 60, which causes the motor 27 to turn in a clockwise direction as viewed from FIG. 1. As the motor 27 turns in a clockwise direction the plate 46 rotates with respect to the plate 20 and a greater amount of the slot means 47 overlies the slot means 22 thereby allowing more fluid to flow from the inlet 12 into the chamber 10. When the fluid pressure in the chamber 10 rises above the predetermined value the low pressure switch 64 opens and power is removed from the motor 27. However, if the pressure in the chamber 10 is so low that it does not rise above the predetermined value before the slot means 47 in the plate 46 completely overlie the slot means 22 in the plate 20 the actuating pin 33 engages the limit switch 31 which de-energizes the motor 27 approximately at the point where the slot means 22 and 47 allow the greatest amount of fluid flow. When the fluid pressure in the chamber 10 is sufficient to close the high pressure switch 65 a circuit is completed to the motor 27 which causes it to rotate in a counterclockwise direction as viewed from FIG. 1. This removes the actuating pin 33 from engagement with the limit switch 31, however, the low pressure switch 64 is open so no power is applied to the field winding 61. As the motor 27 rotates in a counterclockwise direction the slot means 47 in the plate 46 gradually move to a position where they overlie the blank portion between the slot means 22 on the plate 20. Thus, the fluid flowing from the inlet 12 is gradually reduced and the pressure in the chamber 10 is consequently reduced. When the pressure in the chamber 10 falls below the maximum predetermined value the high pressure switch 65 opens and the motor 27 is de-energized. If the pressure in the chamber 10 is so high that the switch 65 does not open when the slot means 47 and the slot means 22 are completely closed the actuating pin 33 engages the limit switch 32 and deenergizes the motor 27.

Since the plates 20 and 46 are mounted in close proximity any dirt that would tend to collect in the slot means 22 and 47 or between the plates 20 and 46 is scraped off by the relative movement therebetween. Also, the air flowing from the inlet 12 to the chamber 10 through the slot means 22 and 47 is relatively even across the entire cross-section since relative movements of the plates 20 and 46 provide an opening which is spiral shaped but increases or decreases in width (as well as increasing slightly in length) rather than simply increasing in length.

While we have shown and described a specific embodiment of this invention, further modification and improvements will occur to those skilled in the art. We desire it to be understood, therefore, that this invention is not limited to the particular form shown and we intend in the appended claims to cover all modifications which do not depart from the spirit and scope of this invention.

What is claimed is:
1. Fluid flow control apparatus comprising:
 (a) a passageway for fluid flow;
 (b) a first plate having single start, double pitch spiral slot means therethrough beginning adjacent the outer edge of said first plate and spiralling inwardly about the axis thereof and mounted so as to limit a flow of fluid through said passageway to said slot means therein;
 (c) a second plate mounted parallel and in juxtaposition to said first plate for concentric rotation relative thereto and having slot means therethrough matching said slot means in said first plate for allowing a maximum flow of fluid in a first position of said second plate relative to said first plate and substantially no flow of fluid in a second position of said second plate relative to said first plate; and
 (d) motor means controllable to rotate said second plate between said first and second positions.
2. Fluid flow control apparatus comprising:
 (a) a passageway for fluid flow;
 (b) a first plate having slot means therethrough and mounted so as to limit a flow of fluid through said passageway to said slot means therein;
 (c) a second plate mounted parallel and injuxtaposition to said first plate for concentric rotation relative thereto and having slot means therethrough matching said slot means in said first plate for allowing a maximum flow of fluid in a first position of said second plate relative to said first plate and substantially no flow of fluid in a second position of said second plate relative to said first plate;
 (d) motor means controllable to rotate said second plate between said first and second position; and
 (e) control means associated with said motor means including high and low pressure responsive means and high and low pressure limit switches operatively connected to the motor means to control the rotation of the second plate for maintaining the fluid pressure in the passageway between predetermined levels and for limiting the rotation of said second plate between the first and second position during large pressure changes.

References Cited

UNITED STATES PATENTS

| | | | |
|---|---|---|---|
| 846,644 | 3/1907 | Brady | 137—625.31 |
| 881,228 | 3/1908 | Dyblie | 137—625.31 XR |
| 1,625,010 | 4/1927 | Windt | 251—134 |
| 2,197,176 | 4/1940 | Dugan | 137—487.5 |
| 2,938,536 | 5/1960 | Ehrenberg | 137—487.5 XR |
| 2,962,593 | 11/1960 | Thomas | 137—487.5 XR |

M. CARY NELSON, *Primary Examiner.*

R. J. MILLER, *Assistant Examiner.*

U.S. Cl. X.R.

137—625.3; 251—134